(12) United States Patent
Tang

(10) Patent No.: US 11,009,433 B2
(45) Date of Patent: May 18, 2021

(54) COMPOSITION AND METHOD FOR SOLID-STATE TISSUE CLEARING

(71) Applicant: iSun Technology LTD., Hsinchu (TW)

(72) Inventor: Shiue-Cheng Tang, Taoyuan (TW)

(73) Assignee: ISUN TECHNOLOGY LTD., Hsinchu (TW)

( * ) Notice: Subject to any disclaimer, the term of this patent is extended or adjusted under 35 U.S.C. 154(b) by 396 days.

(21) Appl. No.: 16/154,752

(22) Filed: Oct. 9, 2018

(65) Prior Publication Data

US 2019/0271616 A1 Sep. 5, 2019

Related U.S. Application Data

(60) Provisional application No. 62/637,398, filed on Mar. 2, 2018.

(51) Int. Cl.
*G01N 1/30* (2006.01)
*G01N 1/44* (2006.01)

(52) U.S. Cl.
CPC .................. *G01N 1/30* (2013.01); *G01N 1/44* (2013.01)

(58) Field of Classification Search
CPC ............ C12Q 2565/514; C12Q 1/6837; C12Q 2533/101; C12Q 2535/122; C12Q 1/6841; C12Q 2533/107; C12Q 2535/131; C12Q 2565/519; C12Q 1/6844; C12Q 1/6874; C12Q 1/6876; C12Q 2525/161; C12Q 2525/179; C12Q 2527/156; C12Q 2543/101; C12Q 2563/149; C12Q 2565/537; C12Q 2565/60; G01N 1/30; G01N 1/44; G01N 1/34; G01N 2333/245; G01N 2333/31; G01N 2333/40; G01N 2400/00; G01N 2800/26; G01N 33/48735; G01N 33/54326; G01N 33/56911; G01N 33/56961; A61K 2039/505; A61K 2123/00; A61K 47/665; A61K 47/6898; A61K 51/065; A61P 31/04; B82Y 5/00; C07K 14/7056; C07K 16/12; C07K 16/1203; C07K 16/1271; C07K 16/14; C07K 2317/41; C07K 2317/52; C07K 2317/71; C07K 2317/73; C07K 2319/30; C07K 2319/33; C11D 7/10; C11D 7/263; C11D 7/3209; C11D 7/3263; C11D 7/3272; C11D 7/34

See application file for complete search history.

(56) References Cited

U.S. PATENT DOCUMENTS

| | | | |
|---|---|---|---|
| 6,416,960 B1 * | 7/2002 | Bryan | A61K 49/0013 424/130.1 |
| 6,596,257 B2 * | 7/2003 | Bryan | A61K 49/0013 424/9.1 |
| 10,350,570 B2 * | 7/2019 | Gunderson | C12Q 1/68 |
| 2002/0090659 A1 * | 7/2002 | Bryan | A61K 49/0013 435/7.23 |
| 2007/0254005 A1 * | 11/2007 | Pathak | A61L 27/34 424/423 |
| 2017/0027168 A1 * | 2/2017 | Heath | A61P 17/00 |
| 2018/0141020 A1 * | 5/2018 | Gunderson | C12Q 1/6837 |
| 2019/0271616 A1 * | 9/2019 | Tang | G01N 1/30 |
| 2019/0374923 A1 * | 12/2019 | Gunderson | C12Q 1/6837 |
| 2020/0224129 A1 * | 7/2020 | Lai | C11D 7/3209 |

* cited by examiner

*Primary Examiner* — Deborah K Ware

(57) ABSTRACT

Disclosed herein is a composition for making a biological material (such as a tissue or an organ of an animal) transparent at solid state. Also disclosed herein is a method for rendering a biomaterial transparent at solid state by the application of the present composition.

15 Claims, 4 Drawing Sheets
(4 of 4 Drawing Sheet(s) Filed in Color)

(A)

(B)

(C)

(D)

COMPOSITION AND METHOD FOR SOLID-STATE TISSUE CLEARING

CROSS REFERENCES TO RELATED APPLICATIONS

This application claims the benefit of U.S. Provisional Application Ser. No. 62/637,398 filed Mar. 2, 2018; the entire content of which is incorporated herein by reference.

BACKGROUND OF THE INVENTION

1. Field of the Invention

The present disclosure in general relates to compositions and methods for making a biological material (such as a tissue or an organ of an animal) transparent at solid state.

2. Description of Related Art

Conventionally, to visualize the internal targets of a thick biomaterial, the biomaterial is first sectioned into thin slices before images are captured. The acquired images are then reconstructed in three dimensions so that valuable spatial information can be derived therefrom. However, the tissue image reconstruction process is neither efficient nor accurate. Over the past two decades, a number of reagents and/or techniques have been developed to improve photon penetration of biomaterials, including the benzyl alcohol/benzyl benzoate solution (or Murray's clear) described by Dodt et al. (Nature Methods (2007) 4(4), 331-336), the urea-based SCALEVIEW-A2 solution described by Miyawaki et al. (see US 20130045503A1), the CLARITY technique described by Chung et al. (Nature (2013) 497, 332-337), and the FocusClear solution described by Ann-Shyn Chiang (see U.S. Pat. No. 6,472,216 B1). All of these reagents render a biomaterial transparent at solution state, thus requiring subsequent mounting of the transparent specimen in a suitable holder for imaging analysis, such as the 3-dimensional (3-D) confocal imaging analysis. Furthermore, such solution-based tissue-clearing methods suffer from a critical drawback—the gradual change of the reflective index caused by the slow evaporation of the liquid components (e.g., solvent).

The present invention is made to solve the aforementioned drawbacks of the solution-based tissue-clearing methods and to provide a novel clearing composition that can make biological tissues, organs, and materials transparent in a quick, easy, and safe way.

SUMMARY

The present disclosure is based, at least in part, on an unexpected discovery that a biological material (e.g., a tissue or an organ of an insect or a mammal) can be rendered transparent at solid state via subjecting it to treatment of the present composition, hence allowing the biomaterial, typically pre-labeled with a marker (e.g., a dye or a fluorescent protein), to be directly used in any subsequent imaging analysis without the need to transfer it to and/or mount it on another subject, as required by the conventional solution-based tissue-clearing method.

Accordingly, one aspect of the present disclosure is to provide a novel composition for rendering a biomaterial transparent at solid state. The composition is characterized by having an acrylamide-based monomer, a disaccharide, a cross-linking agent, a photo-initiator, and a solvent, in which the acrylamide-based monomer and the disaccharide are respectively present in the composition in the amount of 15-45% by weight, the cross-linking agent is present in the composition in the amount of 2-10% by weight, the photo-initiator is present in the composition in the amount of no more than 2% by weight, and the solvent makes up the rest of the weight of the composition. The composition forms a solid-state polymer upon being irradiated by UV light.

According to embodiments of the present disclosure, the acrylamide-based monomer may be selected from the group consisting of methacrylamide, N-hydroxymethyl acrylamide, acrylamide, and a combination thereof.

According to embodiments of the present disclosure, the disaccharide may be selected from the group consisting of maltitol, isomalt, lactitol, sucrose, trehalose, and a combination thereof.

According to embodiments of the present disclosure, the cross-linking agent may be selected from the group consisting of triethylene glycol dimethacrylate, N,N'-methylenebisacrylamide, and a combination thereof.

According to embodiments of the present disclosure, the photo-initiator may be selected from the group consisting of Irgacure 2959, Darocur 1173, and a combination thereof.

According to embodiments of the present disclosure, the solvent is preferably water.

The present disclosure also encompasses a method for rendering a biomaterial transparent at solid state. The method includes steps of:

(a) applying the composition of the present disclosure to the biomaterial until the biomaterial is completely submersed therein; and (b) irradiating the product of the step (a) by UV light until a polymer is formed.

According to embodiments of the present disclosure, the biomaterial may be a tissue derived from an insect or a mammal.

According to embodiments of the present disclosure, the tissue derived from a mammal may be brain, heart, lung, stomach, pancreas, intestine, liver, kidney, or colon.

According to embodiments of the present disclosure, the biomaterial may be pre-labeled with an imaging tracer that is a dye, a fluorescent protein, or an antibody conjugated with a fluorescent marker.

The details of one or more embodiments of this disclosure are set forth in the accompanying description below. Other features and advantages of the invention will be apparent from the detailed description and the claims.

It is to be understood that both the aforementioned general description and the following detailed description are exemplary, and are intended to provide further explanation of the invention as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

The accompanying drawings, which are incorporated in and constitute a part of the specification, illustrate various sample systems, methods, and other exemplified embodiments of various aspects of the invention. The present description will be better understood from the following detailed description with the accompanying drawings, where.

DETAILED DESCRIPTION OF THE INVENTION

Figure 1:
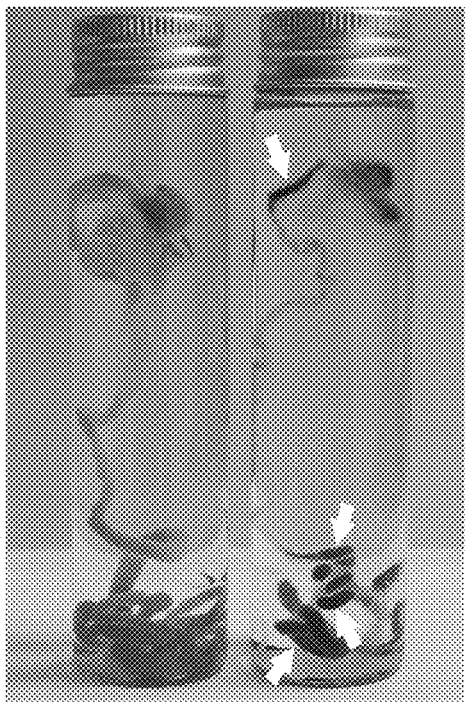
FIG. 1 shows the photographs of tissues with or without the clear treatment in accordance with one embodiment of the present disclosure; (A) the mouse gastrointestinal tissue in saline (left) and in the present tissue clearing polymer (right; arrows indicate the luminal contents); (B) the mouse colon specimen in saline (left) and in the present tissue clearing polymer (right); and (C) the human pancreatic specimen in saline (left) and in the present tissue clearing polymer (right).

The detailed description provided below in connection with the appended drawings is intended as a description of the present disclosure and is not intended to represent the only forms in which the present disclosure may be constructed or utilized.

The present disclosure, in general, relates to a composition that is capable of making a biological material (e.g., a tissue or an organ of an insect or a mammal) transparent at solid state, hence allowing the transparent biological material to be directly used in the subsequent imaging analysis for evaluation of the condition of a tissue (e.g., angiogenesis, inflammation, lymphangiogenesis, and/or neurotrophy), which in turn may be linked to the development of a disease.

Accordingly, one aspect of the present disclosure aims to provide a composition for rendering a biomaterial transparent at solid state. To achieve such purpose, polymeric monomers suitable for use in a photo-activated polymerization reaction are mixed in a solvent with a cross-linking agent and a disaccharide in the presence of a catalyst (i.e., a photo-initiator); the mixture is then exposed to UV light to initiate a free-radical polymerization reaction, thereby forming a solid polymeric matrix that renders a biomaterial embedded therein transparent.

Examples of a polymeric monomer suitable for use in the present disclosure include, but are not limited to, methacrylamide, N-hydroxymethyl acrylamide, acrylamide, and a combination thereof. Examples of a cross-linking agent suitable for use in the present disclosure include, but are not limited to, triethylene glycol dimethacrylate, N,N'-methylenebisacrylamide, and a combination thereof. Examples of a disaccharide suitable for use in the present disclosure include, but are not limited to, maltitol, isomalt, lactitol, sucrose, trehalose, and a combination thereof. Examples of a photo-initiator suitable for use in the present disclosure include, but are not limited to, Irgacure 2959, Darocur 1173, and a combination thereof. Examples of a solvent suitable for use in the present disclosure include, but are not limited to, water and buffer solutions. Suitable buffer solutions that may achieve such purpose include equilibrium salt solutions, such as PBS and HBSS; a tris-buffered saline (TBS); an artificial cerebrospinal fluid (ACSF); and basal cell culture media, such as the non-essential amino acid solution (MEM), Dulbecco's DMEM, and Ham's F-12.

According to preferred embodiments of the present disclosure, the present composition comprises an acrylamide-based monomer (accounting for about 15-45% of the composition by weight); a cross-linking agent (accounting for about 2-10% of the composition by weight); a disaccharide (accounting for about 15-45% of the composition by weight); a photo-initiator (accounting for no more than 2% of the composition by weight); and a solvent (which makes up the rest of the weight of the composition).

According to one preferred embodiment of the present disclosure, the present composition comprises about 40% (by weight) of a combination of methacrylamide, N-hydroxymethyl acrylamide, and acrylamide; about 6% (by weight) of a combination of triethylene glycol dimethacrylate and N,N'-methylenebisacrylamide; about 24% (by weight) of a combination of maltitol, isomalt, lactitol, sucrose, and trehalose; no more than 2% (by weight) of a combination of Irgacure 2959 and Darocur 1173; and water, which makes up the rest of the weight of the composition. The composition automatically forms a polymer once it is subjected to UV radiation, rendering a biomaterial embedded therein transparent. In general, the transparent specimen allows deep-tissue imaging with the resolving power to differentiate two adjacent nuclei up to 500 μm in confocal microscopy.

The biomaterial may be a tissue or an organ of a plant or an animal, preferably a tissue or an organ of an animal, such as an insect, a fish, an amphibian, a bird, or a mammal; and more preferably, a tissue or an organ of a mammal. The mammal is not limited to a laboratory animal, such as a mouse, a rat, a rabbit, a guinea pig, or a primate other than a human; a pet animal, such as a dog or a cat; a farm animal, such as a cow, a horse, or a sheep; or a human. A tissue or an organ is preferably derived from a mammal. According to certain embodiments of the present disclosure, the biomaterial may be the brain, heart, lung, stomach, pancreas, intestine, liver, kidney, or colon of a mouse; the pancreas of a human; or a bio-engineered collagen scaffold.

According to further embodiments of the present disclosure, the biomaterial may be pre-labeled with an imaging tracer that is a dye (e.g., propidium iodine or long-chain lipophilic carbocyanine dye), a fluorescent protein (e.g., enhanced green fluorescent protein), or an antibody (e.g., anti-tyrosine hydroxylase) conjugated with a fluorescent marker so that the imaging tracer may be traced under a microscope, preferably a confocal microscope, after the biomaterial has become transparent.

Also encompassed in the present disclosure is a method for rendering a biomaterial transparent at solid state. The method includes steps of: (a) applying the composition of the present disclosure to a biomaterial until the biomaterial is completely submerged therein; and (b) irradiating the product of the step (a) with UV light until a solid-state polymer is formed.

According to embodiments of the present disclosure, a biomaterial, such as a human pancreatic tissue or the entire mouse gastrointestinal tract, is placed in a container. Then, the present composition, prepared by mixing respective ingredients together but without the exposure of UV light, is added into the container until the biomaterial is completely submersed therein. Next, the container, housing therein the present composition and the biomaterial, is subjected to UV irradiation to induce the light-initiated free-radical polymerization, thereby forming a solid-state polymer. Preferably, the container is irradiated with the UV light having a wavelength between 10 nm and 400 nm, such as 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400 nm; and the light-activated free-radical polymerization is allowed to proceed for at least 2 minutes, such as 2, 3, 4, 5, 6, 7, 8, 9, or 10 minutes, or until the entire mixture is solution free and the biomaterial becomes embedded in the newly formed polymer and turns transparent. Further, the clear treatment of the present method may take place at a temperature from about 0° C. to about 50° C., such as at about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50° C.; preferably, the UV light-initiated polymerization reaction takes place at the temperature between about 0 and 25° C., such as at 0, 1, 2, 3, 4, 5, 6, 7, 8, 9, 10, 11, 12, 13, 14, 15, 16, 17, 18, 19, 20, 21, 22, 23, 24, or 25° C.; most preferably, at about 24° C.

Notwithstanding that the numerical ranges and parameters setting forth the broad scope of the invention are approximations, the numerical values set forth in the specific examples are reported as precisely as possible. Any numerical value, however, necessarily contains certain errors resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values, and percentages, such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and the attached claims are approximations that can vary as desired. At the very least, each numerical parameter should at least be construed in light of the number of reported significant digits and by applying ordinary rounding techniques.

The singular forms "a," "an," and "the" are used herein to include plural referents unless the context clearly dictates otherwise.

The present invention will now be described more specifically with reference to the following embodiments, which are provided for the purpose of demonstration rather than limitation. While they are typically of those that might be used, other procedures, methodologies, or techniques known to those skilled in the art may alternatively be used.

EXAMPLES

Example 1. Preparation and Characterization of Transparent Biomaterials Rendered by Solid-State Tissue-Clearing Treatment 1.1 Preparation of Transparent Biomaterals For tissue-clearing purpose, biomaterials including the entire mouse gastrointestinal tract and specimens from the mouse colon and human pancreas were respectively subjected to the clear treatment. In the process, respective ingredients of a tissue clearing composition (see Table 1) were first dissolved and placed in a container. Then the biomaterial was placed inside the container, allowing it to be completely covered by the composition, and then gently rotated on an orbital shaker at 40° C. (10 minutes for 500 μm vibratome sections). Next, the container with the submersed biomaterial was irradiated with UV light (about 2 minutes for 500-μm sections) to induce free-radical polymerization, thereby embedding the biomaterial in the newly formed polymer. Results are depicted in FIG. 1.

TABLE 1

| The tissue clearing composition | | |
|---|---|---|
| Components | | Percentage (wt %) |
| Monomer | Methacrylamide | 24 |
| | N-hydroxymethyl acrylamide | 12.9 |
| | Acrylamide | 3.6 |
| Disaccharide | Maltitol | 7 |
| | Isomalt | 7 |
| | Lactitol | 7 |
| | Sucrose | 1.5 |
| | Trehalose | 1.5 |
| Cross-linking agent | Triethylene glycol dimethacrylate | 5 |
| | N,N'-methylenebisacrylamide | 0.5 |
| Photo-initiator | Irgacure 2959 | 0.09 |
| | Darocur 1173 | 0.09 |
| Solvent | Water | 29.82 |

Reference is made to the photographs of FIG. 1, where the entire mouse gastrointestinal tract (panel A), the mouse colon specimen (panel B), and the human pancreatic specimen (panel C) were respectively embedded in the solidified polymer formed by the tissue clearing composition of Table 1 and became transparent, as compared with those in saline.

1.2 Imaging Analysis of the Transparent Mouse Colon Tissue of Example 1.1

Figure 2:
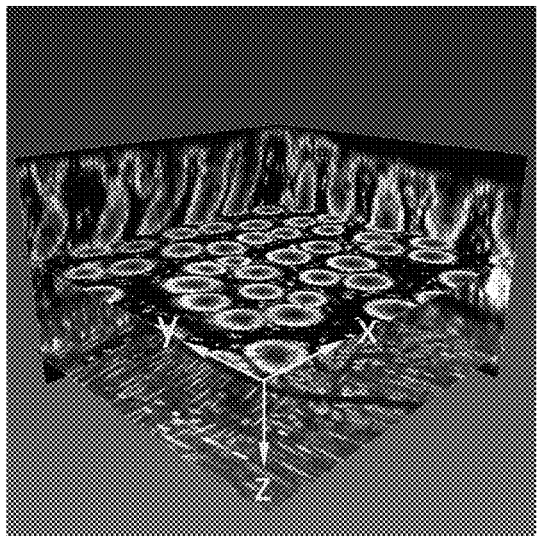
FIG. 2 shows the confocal images of the mouse colon specimen after the clear treatment in accordance with one embodiment of the present disclosure; (A) the orthogonal view of the mouse colon, in which colonic crypts (mucosal structure) and muscles are shown; size of the image stack, 360×360×250 (x, y, z) μm; (B) the 3-D projection of mouse colonic vasculature; (C) the 3-D projection of enteric nerves in colon; and (D) the merged images of (B) and (C).
Figure 2:
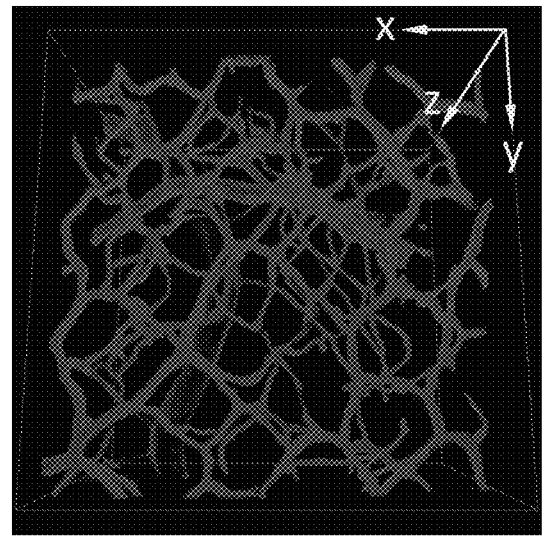
Figure 2:
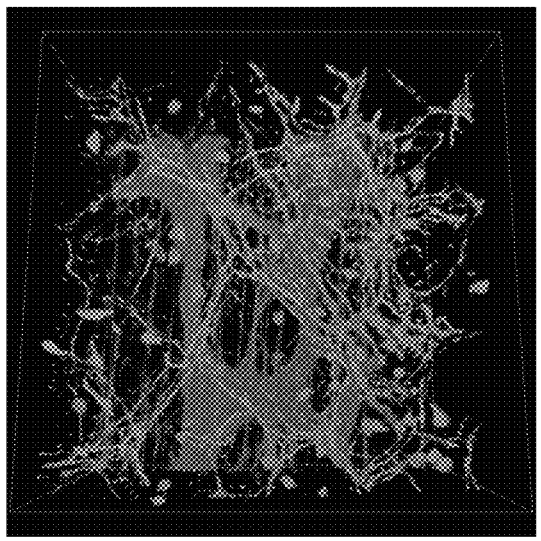
Figure 2:
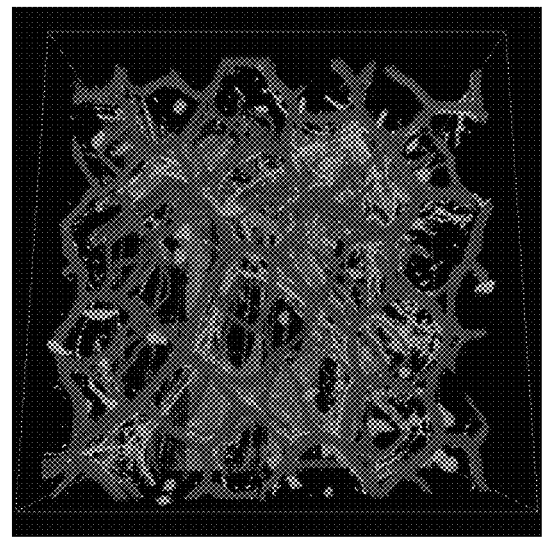

The transparent mouse colon specimen of Example 1.1 was further subjected to the 3-D confocal imaging analysis. As the photographs of FIG. 2 demonstrated, tissue clearing makes it possible to collect data for visualizing the colonic neurovascular structures that were previously unable to be seen in non-transparent tissues.

1.3 Imaging Analysis of the Transparent Human Pancreatic Tissue of Example 1.1

Figure 3:
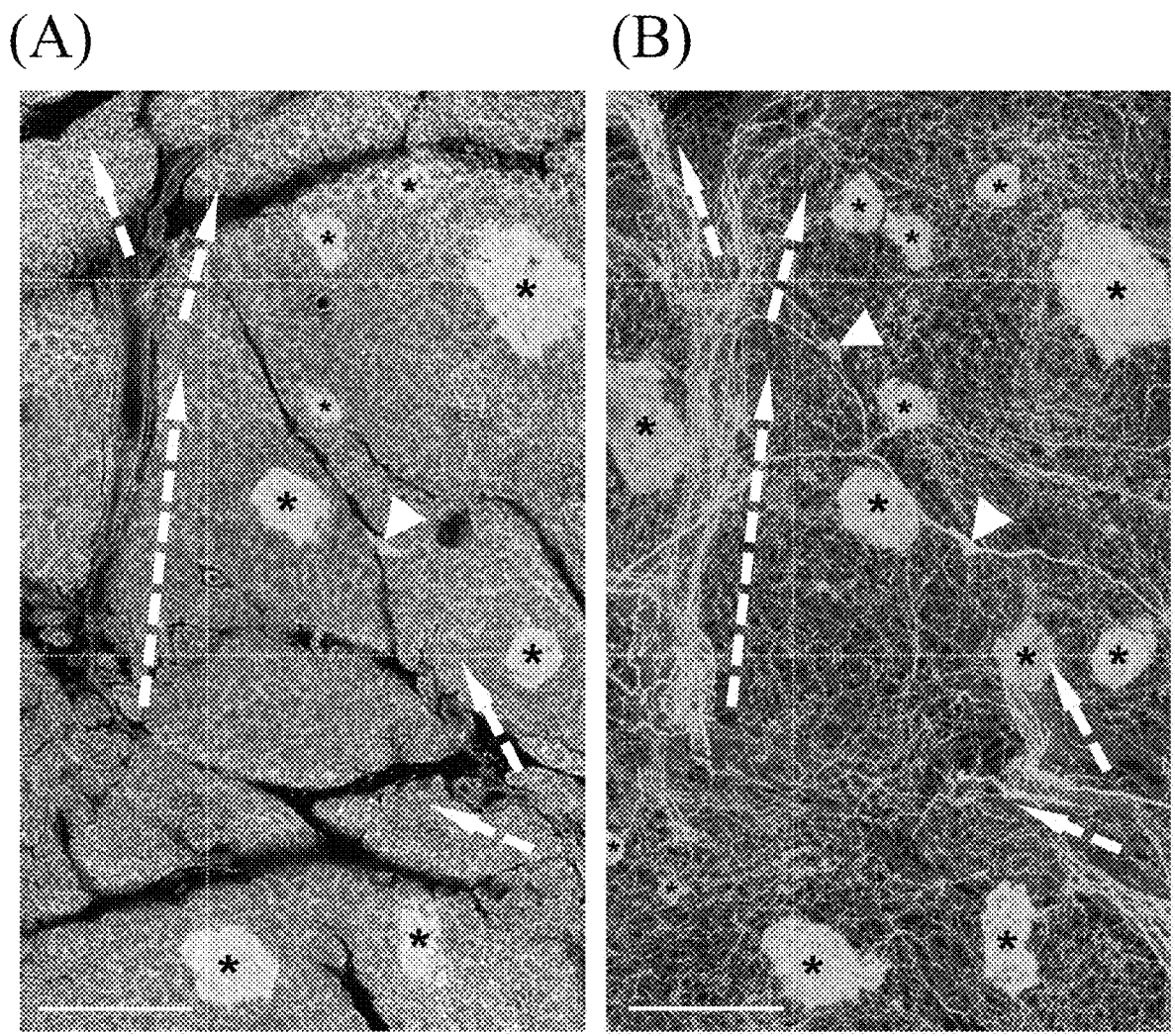
FIG. 3 shows the 2-D image and 3-D projection of the human pancreatic neuro-insular network derived from a human pancreatic specimen after the clear treatment in accordance with one embodiment of the present disclosure; (A) the 2-D fluorescence image of a human pancreas; and (B) the 3-D projection of the human pancreatic neuro-insular network. Green, neuroendocrine marker PGP9.5 staining, which reveals the pancreatic neuro-insular network. Red, vascular marker CD31 staining. White, nuclear staining. Dashed arrows, peri-arteriolar neurovascular association. Arrow heads, intra-pancreatic ganglia. Asterisks, islets. Scale bars, 500 μm.

In this example, the transparent human pancreatic specimen of Example 1.1 was subjected to both the 2-D and 3-D imaging analysis. As the photographs in FIG. 3 demonstrated, the 2-D image (panel A) allowed the standard lobular structure of the human pancreas to be seen, featuring the endocrine islets scattered in the exocrine acini and surrounded with condensed neurovascular networks, which modulate the islet hormone secretion. The 3-D image (panel B) revealed the neuro-insular network (i.e., the association of islets with the nervous system), which otherwise could not be portrayed via the standard microtome-based histology.

Example 2. Deep-Tissue Imaging Analysis on Transparent Mouse Kidney Specimen

In this example, the renal blood vessels of the wildtype C57BL/6 (B6) mouse were first labeled by cardiac perfusion of the lectin-Alexa Fluor 488 conjugates (30 µg/g of body weight, Invitrogen, Carlsbad, Calif., USA; fluorescent dyes binding to the endothelial cellular membranes in perfusion), followed by 4% paraformaldehyde perfusion fixation. Then, the kidney was harvested and post-fixed in a 4% paraformaldehyde solution for 40 minutes at 15° C. The vibratome sections of the fixed tissue (400 µm) were then immersed in a 2% Triton X-100 solution for two hours at 15° C. for permeabilization. SYTO Orange staining (Invitrogen) was performed to label the nuclei.

The labeled specimens were then subjected to tissue clearing in accordance with the procedures described in Example 1. Next, the transparent specimens were placed under the Zeiss LSM 800 confocal microscope (Carl Zeiss, Jena, Germany) for imaging analysis, in which a laser-scanning process was performed using the multi-track scanning mode. The SYTO Orange-labeled nuclei were excited at 543 nm and the signals were collected by the 560-615 nm band-pass filter. The lectin-Alexa Fluor 488-labeled blood vessels were excited at 488 nm and the fluorescence was detected using the 500-550 nm band-pass filter. Results are depicted in FIG. 4.

Figure 4:
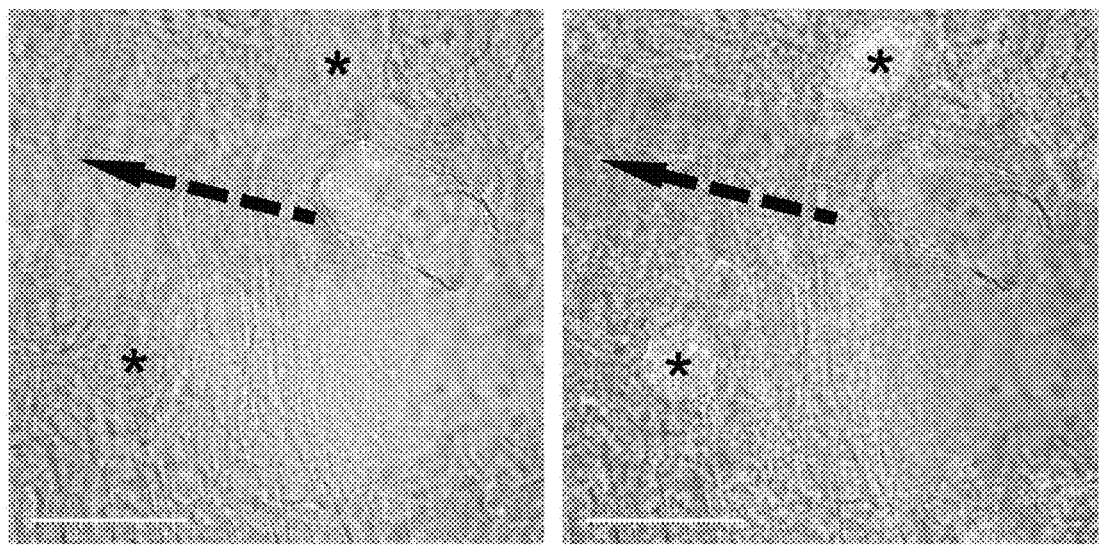
FIG. 4 shows the photographs of a mouse kidney specimen pre-labeled with lectin-Alexa Fluor 488 conjugates after the clear treatment in accordance with one embodiment of the present disclosure; (A) a transmitted light photograph; and (B) overlap of two photographs taken respectively via the transmitted light microscopy and fluorescence microscopy. Asterisk, glomerulus. Dashed arrow, arteriole. Red, vascular staining. Green, nuclear staining. Scale bars, 200 μm.

As presented in the photographs in FIG. 4, once the kidney specimen became transparent, photons can penetrate the tissue, allowing the renal microstructure and vasculature to be visualized with both the transmitted light microscopy (panel A) and fluorescence microscopy (panel B).

Example 3. Deep-Tissue Imaging Analysis on Human Pancreatic Intraepithelial Neoplasia In this example, an optically cleared human pancreatic specimen, which was taken 5 cm distal to a pancreatic ductal adenocarcinoma, was subjected to 2-D and 3-D imaging to gather structural data for disease analysis.

The acquired specimen was prepared in accordance with the procedure described in Example 2, except that the sympathetic marker tyrosine hydroxylase (AB152, Millipore, Billerica, Mass., USA) staining was used in this example to reveal the peri-arteriolar sympathetic innervation of the disease tissue.

Figure 5:
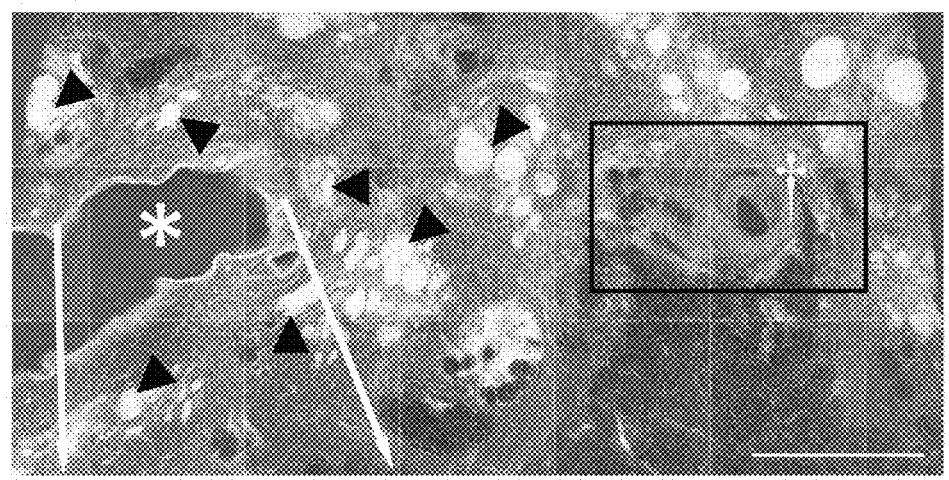
FIG. 5 shows the 2-D image and the 3-D projection of a human pancreatic intraepithelial neoplasia derived from a disease pancreatic specimen after the clear treatment in accordance with one embodiment of the present disclosure; (A) the tissue map taken 5 cm distal to a pancreatic ductal adenocarcinoma; arrow heads, islets; (B) the magnified 3-D projection of the duct lesion (asterisk; arrows correlate the positions in panel A and B); and (C) the magnified 3-D projection of the peri-arteriolar sympathetic innervation. Box in (A) is magnified in (C). Dagger, arteriole. Green, sympathetic marker tyrosine hydroxylase staining. Red, vascular marker CD31 staining. White, nuclear staining. Scale bars: (A), 1 mm; (B) and (C), 500 μm.
Figure 5:
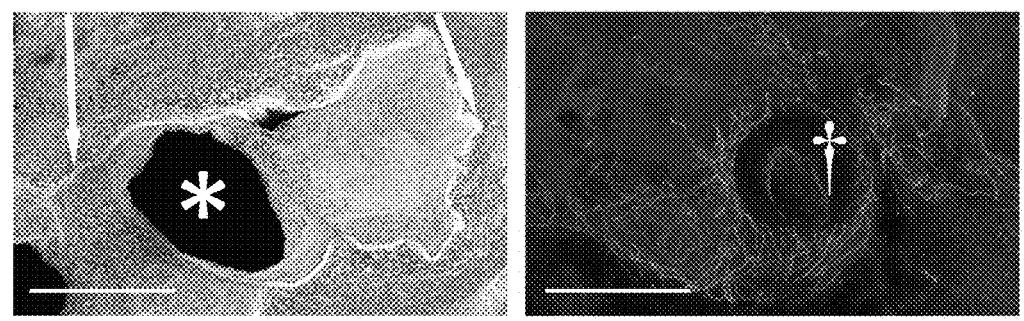

The tissue map derived from the 2-D imaging analysis of the transparent specimen is presented in panel A of FIG. 5, in which the duct lesion progression was found to be associated with fatty infiltration (revealed via transmitted light signals) and the peri-lesional aggregation of the endocrine islets (denoted by the arrow heads in panel A of FIG. 5). Magnified 3-D images of the duct lesion (FIG. 5, panel B) and the peri-arteriolar sympathetic innervation (FIG. 5, panel C) highlight the pancreatic tissue remodeling in lesion progression and the association of neurovascular tissues with the neoplasia.

In sum, the tissue clearing composition of the present disclosure achieves tissue clearing at solid state, allowing the transparent specimen to be directly used in the subsequent imaging analysis, a condition that cannot be achieved by any conventional tissue clearing process and/or reagent.

It will be understood that the above description of embodiments is given by ways of examples only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or the scope of the present disclosure.

What is claimed is:

1. A composition for solid-state tissue clearing comprising an acrylamide-based monomer, a disaccharide, a cross-linking agent, a photo-initiator, and a solvent; wherein the acrylamide-based monomer and the disaccharide are respectively present in the composition in the amount of 15-45% by weight, the cross-linking agent is present in the composition in the amount of 2-10% by weight, the photo-initiator is present in the composition in the amount of no more than 2% by weight, and the solvent makes up the rest of the weight of the composition; and the composition forms a solid-state polymer upon exposure to UV light.

2. The composition of claim 1, wherein the acrylamide-based monomer is selected from the group consisting of methacrylamide, N-hydroxymethyl acrylamide, acrylamide, and a combination thereof.

3. The composition of claim 1, wherein the disaccharide is selected from the group consisting of maltitol, isomalt, lactitol, sucrose, trehalose, and a combination thereof.

4. The composition of claim 1, wherein the cross-linking agent is selected from the group consisting of triethylene glycol dimethacrylate, N,N'-methylenebisacrylamide, and a combination thereof.

5. The composition of claim 1, wherein the photo-initiator is selected from the group consisting of Irgacure 2959, Darocur 1173, and a combination thereof.

6. The composition of claim 1, wherein the solvent is water.

7. A method for rendering a biomaterial transparent at solid state comprising:
(a) applying the composition of claim 1 to the biomaterial until the biomaterial is completely submerged therein; and
(b) irradiating the product of the step (a) with UV light until the solid-state polymer is formed.

8. The method of claim 7, wherein the acrylamide-based monomer is selected from the group consisting of methacrylamide, N-hydroxymethyl acrylamide, acrylamide, and a combination thereof.

9. The method of claim 7, wherein the disaccharide is selected from the group consisting of maltitol, isomalt, lactitol, sucrose, trehalose, and a combination thereof.

10. The method of claim 7, wherein the cross-linking agent is selected from the group consisting of triethylene glycol dimethacrylate, N,N'-methylenebisacrylamide, and a combination thereof.

11. The method of claim 7, wherein the photo-initiator is selected from the group consisting of Irgacure 2959, Darocur 1173, and a combination thereof.

12. The composition of claim 7, wherein the solvent is water.

13. The method of claim 7, wherein the biomaterial is a tissue derived from an insect or a mammal.

14. The method of claim 13, wherein the tissue derived from a mammal is brain, heart, lung, stomach, pancreas, intestine, liver, kidney, or colon.

15. The method of claim 14, wherein the biomaterial is pre-labeled with an imaging tracer that is a dye, a fluorescent protein, or an antibody conjugated with a fluorescent marker.

* * * * *